United States Patent
Slovacek et al.

(10) Patent No.: US 10,443,801 B2
(45) Date of Patent: Oct. 15, 2019

(54) OPTICAL SYSTEM OF A DIRECTIONAL INDICATOR FOR MOTOR VEHICLES, ESPECIALLY A PROGRESSIVE DIRECTIONAL INDICATOR

(71) Applicant: Varroc Lighting Systems, s.r.o., Senov u Noveho Jicina (CZ)

(72) Inventors: Vit Slovacek, Senov u Noveho Jicina (CZ); Pavel Vlcek, Neredin (CZ); Jiri Harabis, Koprivnice (CZ)

(73) Assignee: Varroc Lighting Systems, S.R.O., Senov u Noveho (CZ)

( * ) Notice: Subject to any disclaimer, the term of this patent is extended or adjusted under 35 U.S.C. 154(b) by 0 days.

(21) Appl. No.: 16/109,408

(22) Filed: Aug. 22, 2018

(65) Prior Publication Data

US 2019/0063709 A1    Feb. 28, 2019

(30) Foreign Application Priority Data

Aug. 29, 2017   (CS) ................................. PV 2017-498

(51) Int. Cl.
*F21S 41/24*    (2018.01)
*F21S 43/50*    (2018.01)
(Continued)

(52) U.S. Cl.
CPC ............. *F21S 41/24* (2018.01); *F21S 41/32* (2018.01); *F21S 43/14* (2018.01); *F21S 43/19* (2018.01);
(Continued)

(58) Field of Classification Search
CPC .......... F21S 41/24; F21S 41/32; F21S 43/247; F21S 43/245; F21S 43/237; F21S 43/19;
(Continued)

(56) References Cited

U.S. PATENT DOCUMENTS 5,295,047 A * 3/1994 Windross ............... G01D 11/28
                                                          362/23.15
5,418,384 A * 5/1995 Yamana ............... G02B 6/0046
                                                          257/443
(Continued)

FOREIGN PATENT DOCUMENTS

DE    102008008180 A1    8/2009
DE    102013104169 A1    10/2014
(Continued)

OTHER PUBLICATIONS

Search Report in Corresponding Czech Application No. PV 2017-498 dated May 21, 2018 (3 pages).

*Primary Examiner* — Joseph L Williams
*Assistant Examiner* — Jose M Diaz
(74) *Attorney, Agent, or Firm* — Hovey Williams LLP (57)    ABSTRACT

The optical system comprises at least one pair of adjacent light-guides (1a, 1b) of a longitudinal shape the surface of which comprises a shell (8) that connects two ends (6) of a light-guide (1a, 1b), and at least one pair of light sources (3), associated with the ends (6) of the light guides (1a, 1b) at the same side of the light guides (1a, 1b), to emit light rays (10) and to ensure their propagation in the direction from the end (6) of the light-guide (1a, 1b) further into the light-guide (1a, 1b) body. Either of the pair of the light-guides (1a, 1b) is equipped in its rear part with optical elements (2) to reflect light rays (10) to its longitudinal exit surface (7a) located on the shell (8) for their exit from the light-guide (1a,1b). The light-guides (1a, 1b) of the said pair of adjacent light-guides (1a, 1b) are located with respect to each other in such a way that in the exit direction of the light rays (10) from the exit surface (7a) one of the light-guides (1a, 1b) acts as the front one (1a) and the other as the rear one (1b) while the rays (10) exiting the rear light-guide (1b) enter the front light-guide (1a) through its shell (8) and exit the front light-guide (1a)

(Continued)

via its longitudinal supplementary exit surface (7b) that creates, together with the exit surface (7a) of the front light-guide (1a), the complete exit surface (7). The light sources (3) of the pair of the light-guides (1a, 1b) are time-controlled in such a way that the required dynamic light display is achieved on the complete exit surface (7).

14 Claims, 7 Drawing Sheets

(51) Int. Cl.
| | |
|---|---|
| F21S 43/40 | (2018.01) |
| F21S 43/14 | (2018.01) |
| F21S 43/31 | (2018.01) |
| F21S 41/32 | (2018.01) |
| F21V 8/00 | (2006.01) |
| F21S 43/19 | (2018.01) |
| F21S 43/237 | (2018.01) |
| F21S 43/245 | (2018.01) |
| F21S 43/247 | (2018.01) |
| F21W 103/20 | (2018.01) |

(52) U.S. Cl.
CPC ........... *F21S 43/237* (2018.01); *F21S 43/245* (2018.01); *F21S 43/247* (2018.01); *F21S 43/31* (2018.01); *F21S 43/40* (2018.01); *F21S 43/50* (2018.01); *G02B 6/005* (2013.01); *F21W 2103/20* (2018.01)

(58) Field of Classification Search
CPC .. F21S 43/14; F21S 43/31; F21S 43/40; F21S 43/50; G02B 6/005; G02B 6/0025; G02B 6/0028; F21W 2103/20; B60Q 3/64; B60Q 3/745
See application file for complete search history.

(56) References Cited

U.S. PATENT DOCUMENTS

| | | | | |
|---|---|---|---|---|
| 6,102,559 | A * | 8/2000 | Nold | B60Q 1/0011 340/468 |
| 7,333,095 | B1 * | 2/2008 | Lieberman | G06F 3/0421 178/18.09 |
| 8,615,151 | B2 * | 12/2013 | Rinko | G02B 6/0036 362/606 |
| 8,950,915 | B2 * | 2/2015 | Natsume | B60Q 1/00 362/511 |
| 9,340,149 | B2 * | 5/2016 | Domini | G02B 6/001 |
| 9,664,375 | B2 * | 5/2017 | Guiset | F24C 7/083 |
| 10,352,525 | B2 * | 7/2019 | Tokieda | B60Q 1/34 |
| 2004/0130904 | A1 | 7/2004 | Yamada et al. | |
| 2010/0048085 | A1 * | 2/2010 | Kayanuma | G02B 6/0018 445/23 |
| 2013/0003399 | A1 * | 1/2013 | de Lamberterie | G02B 6/001 362/511 |
| 2013/0201709 | A1 * | 8/2013 | Natsume | B60Q 1/00 362/511 |
| 2014/0036522 | A1 * | 2/2014 | Nakada | F21S 43/00 362/511 |
| 2015/0184823 | A1 | 7/2015 | Ladenburger | |
| 2016/0363769 | A1 * | 12/2016 | Masuda | G02B 6/0038 |

FOREIGN PATENT DOCUMENTS

| | | |
|---|---|---|
| DE | 102013104176 A1 | 10/2014 |
| EP | 2584249 A1 | 4/2013 |

* cited by examiner

OPTICAL SYSTEM OF A DIRECTIONAL INDICATOR FOR MOTOR VEHICLES, ESPECIALLY A PROGRESSIVE DIRECTIONAL INDICATOR

RELATED APPLICATIONS

This application claims the priority benefit of Czech Patent Application Serial No. PV 2017-498 entitled "An optical system of a directional indicator for motor vehicles, especially a progressive directional indicator," filed Aug. 29, 2018, the entire disclosure of which is incorporated herein by reference.

FIELD OF THE INVENTION

The invention relates to an optical system of a directional indicator for motor vehicles, especially a progressive directional indicator. The invention makes it possible to implement animated (also called as "sequential" or "progressive") directional indication.

BACKGROUND INFORMATION

Within the implementation of the light function with the use of a conductor supplied by LED's, modern sources of vehicles are focused on optical power, style and appearance as well as modern technology. Due to this fact, the design of these elements is gradually becoming more complex and complicated.

From patent references US20150184823A and DE102013104176A1, a lamp for a motor vehicle with a longitudinal light-guide is known. This lamp guides the light through the internal area of the wave-guide using absolute reflection that occurs at the edge areas of the wave-guide (at the boundary of two environments with different refractive indices). The wave-guide has an exit surface, in which the focusing element of the light-guide is located. It is situated in the direction of the light emitted via the exit surface of the wave-guide. Light passes over the entire length of the exit surface. The focusing element is arranged in such a way to decrease diffraction of the light beam that is emitted from the light exit surface of the wave-guide. Disadvantages of this system are high costs associated with the focusing element, which can be replaced by modification of the optical elements, e.g., decrease of diffraction, and also by modification of the front light-guide surface.

The document DE102013104169A1 discloses a lamp for a motor vehicle with two longitudinal light-guides. This system is supplied via multiple inlets, which results in gradual lighting up. A disadvantage of the system is the supply of the secondary light-guide wherein a high number of LED sources are necessary to illuminate the whole horizontal surface (the supply is implemented in vertical sections).

The object of this invention is to design an optical system for motor vehicles, especially a progressive directional indicator that employs light-guides and has low cost requirements due to the fact that the used light-guides are lighter and use fewer sources.

PRINCIPLE OF THE INVENTION

The above mentioned objectives are fulfilled by an optical system of a directional indicator for motor vehicles, especially of a progressive directional indicator, according to the invention, comprising at least one pair of adjacent light-guides of a longitudinal shape the surface of which comprises a shell that connects two ends of a light-guide, and at least one pair of light sources, associated with the ends of the light-guides at the same side of the light-guides, to emit light rays and to ensure their propagation in the direction from the end of the light-guide further into the light-guide body, either of the pair of the light-guides being equipped in its rear part with optical elements to reflect light rays to its longitudinal exit surface located on the shell for their exit from the light-guide. The light-guides of the said pair of adjacent light-guides are located in such a way with respect to each other that in the exit direction of the light rays from the exit surface, one of the light-guides acts as the front one and the other as the rear one while the rays exiting the rear light-guide enter the front light-guide through its shell and exit the front light-guide via its longitudinal supplementary exit surface that creates, together with the exit surface of the front light-guide, the complete exit surface, the light sources of the pair of the light-guides being time-controlled in such a way that the required dynamic light display is achieved on the complete exit surface.

In one of the preferred embodiments, the light sources of the pair of the light-guides are time-controlled in such a way that the longitudinal part with the highest instantaneous intensity of light rays exiting the complete exit surface gradually shifts in the direction from one end of the front light guide to its other end.

In one of the preferred embodiments, the supplementary exit surface of the front light-guide is a coherent continuation of its exit surface.

In another one of the preferred embodiments, the supplementary exit surface of the front light-guide partly lies on its exit surface, its remaining part representing a continuation of its exit surface.

In another one of the preferred embodiments, the supplementary exit surface of the front light-guide entirely lies on its exit surface.

The light sources of the said pair of light sources are preferably LED sources mounted on a common PCB.

In one of the preferred embodiments, the light-guide comprises, in the longitudinal part where light rays from the rear light-guide enter it, the said optical elements in its rear part. The said optical elements can be preferably mounted on the surface of the front light-guide.

In another one of the preferred embodiments, the front light-guide is, in the longitudinal part where light rays from the rear light-guide enter it, without the said optical elements.

In one of the preferred embodiments, the optical system comprises one pair of light sources to supply one pair of adjacent light-guides.

In one of the preferred embodiments, the light-guides have a mushroom-like shape in the cross-section comprising a convex front surface containing the exit surface, and a rear surface having the shape of a stripe, the width of the profile of the front light-guide being bigger than the width of the profile of the rear light-guide.

In another one of the preferred embodiments, the rear light-guide has a mushroom-like shape in the cross-section comprising a convex front surface containing the exit surface, and a rear surface having the shape of a stripe, and the front light-guide has a mushroom-like shape in the cross-section at its one end, and at the other end, adjacent to the shell area through which light rays emitted from the rear light-guide enter the front light-guide, an oblong shape wherein the said mushroom-like shape of the profile of the front light-guide at one of its ends gradually passes into the said oblong shape of the profile at the other end.

In another one of the preferred embodiments, the optical system comprises two pairs of light sources to supply one pair of adjacent light-guides and the rear light-guide has a mushroom-like shape in the cross-section comprising a convex front surface containing the exit surface, and a rear surface having the shape of a stripe, and the front light-guide has a mushroom-like shape in the cross-section at its end, and at the end of the shell area through which light rays emitted from one light source of the rear light-guide enter the front light-guide, an oblong shape wherein the said mushroom-like shape of the front profile of the light-guide at one of its ends gradually passes into the said oblong shape of the profile at the said end of the area of its shell.

In another one of the preferred embodiments, the optical system comprises two pairs of adjacent light-guides, one pair being positioned in an extension of the other pair.

CLARIFICATION OF DRAWINGS

The invention will be clarified in a more detailed way with the use of its embodiment examples with references to attached drawings, where.

EXAMPLES OF EMBODIMENTS OF THE INVENTION

Figure 1:
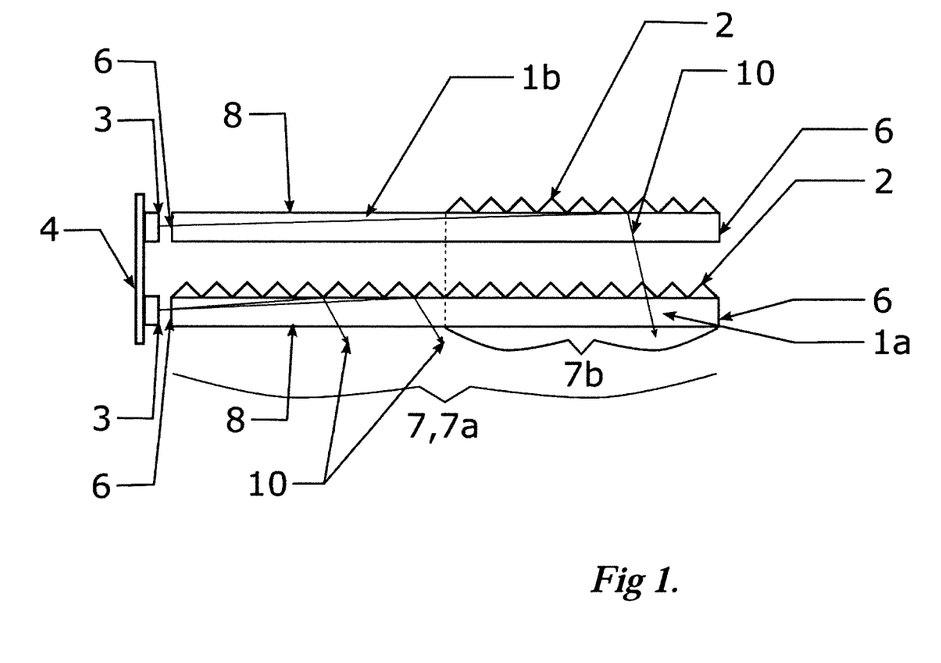
FIG. 1 shows a view in a longitudinal section of an embodiment example of an optical system according to the invention.

FIG. 1 shows a view in a longitudinal section of an embodiment example of an optical system according to the invention, The light-guides 1a, 1b are used as conductors of light where light is conducted by means of total reflection, which occurs at the interface of two environments. The light-guides 1a, 1b can have various profiles of their shape. The front light-guide 1a comprises an exit surface 7a through which light rays 10 emitted by the light source 3 of the front light-guide 1a leave the light guide, the light rays being directed to the exit surface 7a of the front light-guide 1a by the optical elements 2 that the rear part of the front light-guide 1a is equipped with. The optical elements 2 of the front light guide 1a are configured in such a way as to allow passage of light rays 10 emitted from the rear light-guide 1b into the inside of the front light-guide 1a through them. These light rays 10 subsequently exit the front light-guide 1a through its supplementary exit surface 7b, which lies within the exit surface 7a of the front light-guide 1a in this embodiment. The exit surface 7a of the front light-guide 1a together with the supplementary exit surface 7b of the front light-guide 1a form the complete exit surface 7 of the front light-guide 1a. The light sources 3 of the light-guides 1a, 1b are preferably situated on the same plane, e.g., on a printed-circuit board 4.

The light sources 3 of the pair of light sources 3 that supplies the pair of the light-guides 1a, 1b are, in the inventive solutions, generally time-controlled in such a way to provide the required dynamic, i.e., variable in time, light display on the complete exit surface 7 while these light sources 3 are preferably time-controlled in such a manner that the longitudinal section with the highest instantaneous intensity of light rays 10 exiting the complete exit surface 7 can gradually shift with time in the direction from one end 6 of the front light-guide 1a to its other end 6.

Although FIGS. 1 to 5, which show different embodiment examples of an optical system according to the invention, show the use of one pair of adjacent light-guides 1a, 1b, more pairs of adjacent light-guides 1a, 1b can be generally used in an optical system according to the invention. So if e.g., three consecutive light-guides are used altogether, then such an assembly comprises two adjacent pairs of light-guides wherein in each pair, one light-guide is the front light-guide 1a and the other light-guide of this pair is the rear light-guide 1b, which emits rays to the front light guide 1a, in the sense of this invention. So in each pair of adjacent light-guides 1a, 1b, the rear light-guide 1b will illuminate the adjacent light-guide situated in front of it, i.e. the front light-guide 1b, while in the respective distance from the light source 3, the light will be unbound to the front light-guide 1a by the optical elements 2, preferably in such a way to produce the impression of gradual lighting up of the front light-guide 1a in the direction from its one end 6 to the other end 6. The distance of the light source 3 from the light-unbinding surface depends on the design requirements, requirements for efficiency and homogeneity of the system. As explained above, the invention also comprises an embodiment using more pairs of a front 1a and rear 1b light-guide.

Figure 2:
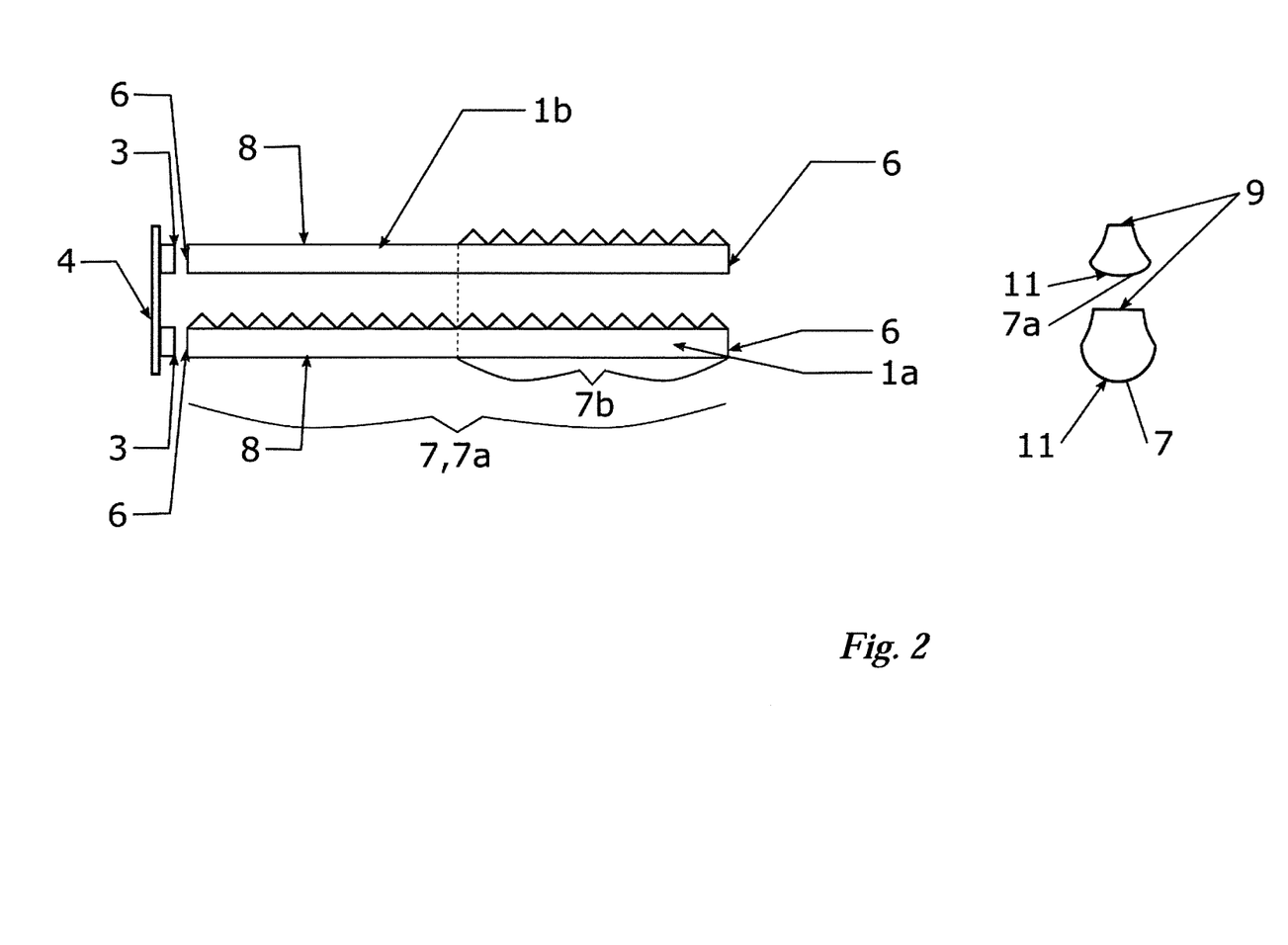
FIG. 2 shows a view in a longitudinal section of another embodiment example of an optical system according to the invention with mushroom-like transversal profiles of the light-guides.

FIG. 2 shows another embodiment example of an optical system according to the invention, this time with particular transversal profiles of the light-guides 1a, 1b while otherwise the above-mentioned description concerning the embodiment shown in FIG. 1 applies to this embodiment as well. As shown in FIG. 2, the front light-guide 1a and the rear light-guide 1b have a mushroom-like shape in the cross-section comprising a convex front surface 11 containing the exit surface 7a, and a rear surface 9 having the shape of a stripe comprising optical elements 2, the width of the profile of the front light-guide 1a being bigger than the width of profile of the rear light-guide 1b.

Figure 3:
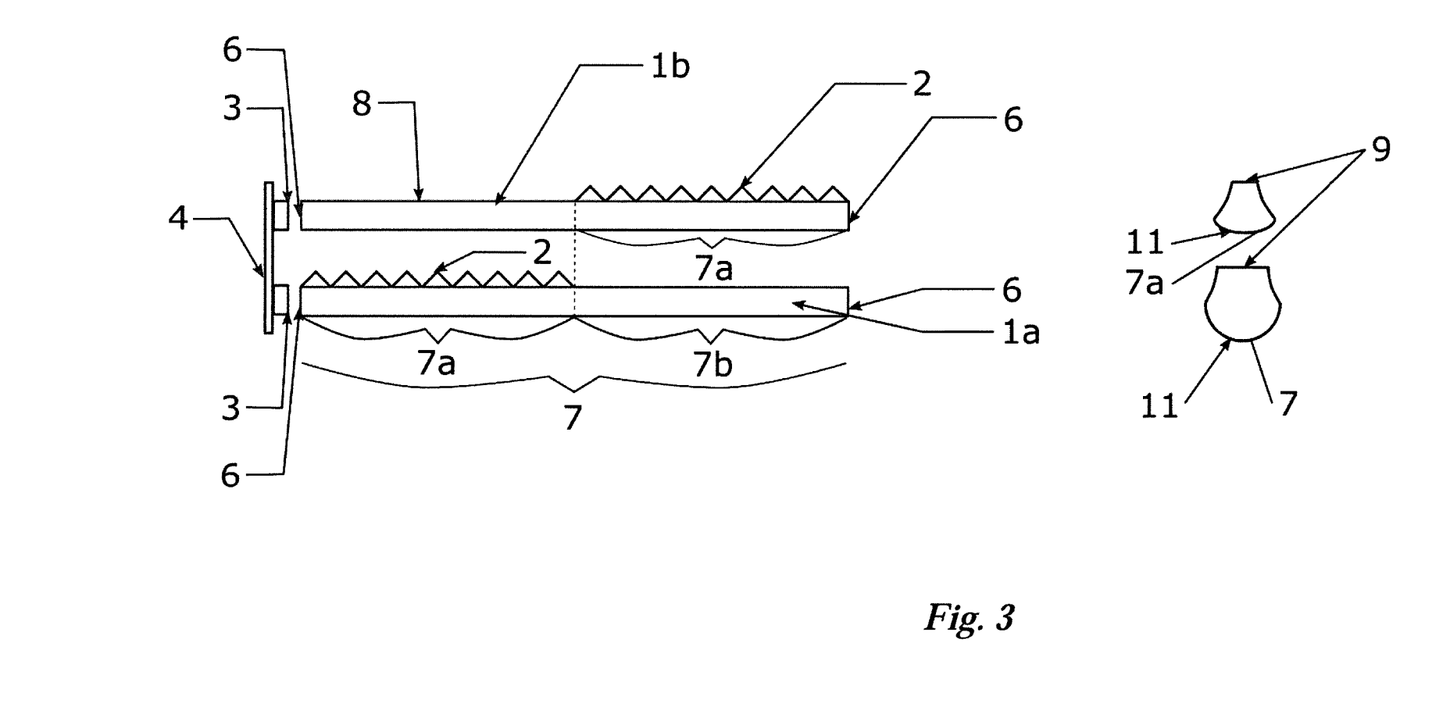
FIG. 3 shows a view in a longitudinal section of another embodiment example of an optical system according to the invention.

FIG. 3 shows another embodiment example of an optical system according to the invention. In this embodiment, the rear light-guide 1b unbinds light into the front light-guide 1a, this light entering the front light-guide 1a through an area of its surface that is not fitted with optical elements 2 for unbinding light produced by the light source 3 of the front light guide 1a.

Figure 4:
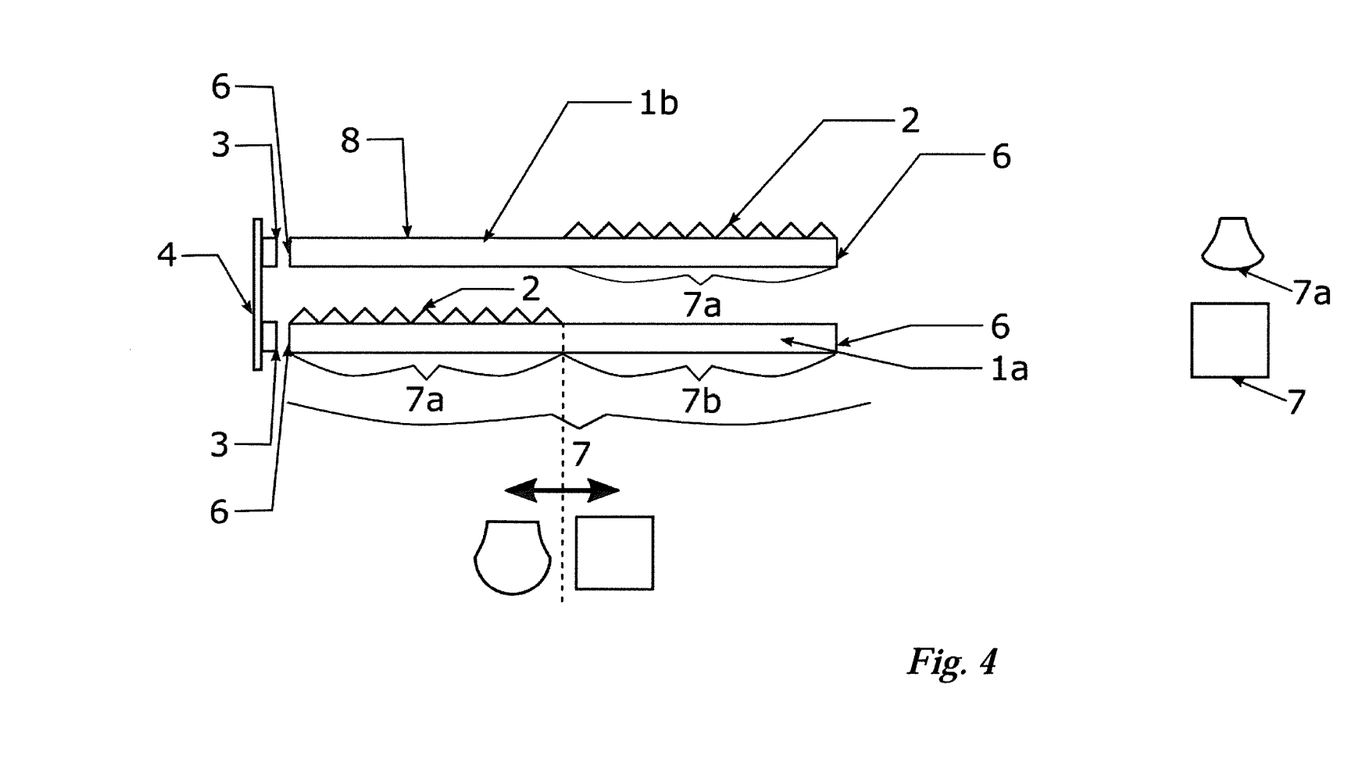
FIG. 4 shows a view in a longitudinal section of another embodiment example of an optical system according to the invention with a mushroom-like profile of the rear light-guide and a changing profile of the front light-guide.

FIG. 4 shows another embodiment example of an optical system according to the invention. In this embodiment, the rear light-guide 1b unbinds light into the front light-guide 1a, this light entering the front light-guide 1a through an area of its surface that is not fitted with optical elements 2 for unbinding light produced by the light source 3 of the front light guide 1a. The rear light-guide 1b has a mushroom-like profile all along its length while the profile of the front light-guide 1a gradually passes from a mushroom-like to an oblong profile in such a way that in the part of the front light-guide 1a where only rays from the light source 3 of the front light-guide 1 are emitted, the mushroom-like profile prevails, and in the remaining part, i.e., the part from which rays coming from the light-source 3 of the rear light-guide 1b are also emitted, the oblong profile prevails. In the latter part, the front light-guide 1a is not fitted with optical elements 2 for unbinding light, i.e. it is only illuminated by the rear light-guide 1b.

Figure 4A:
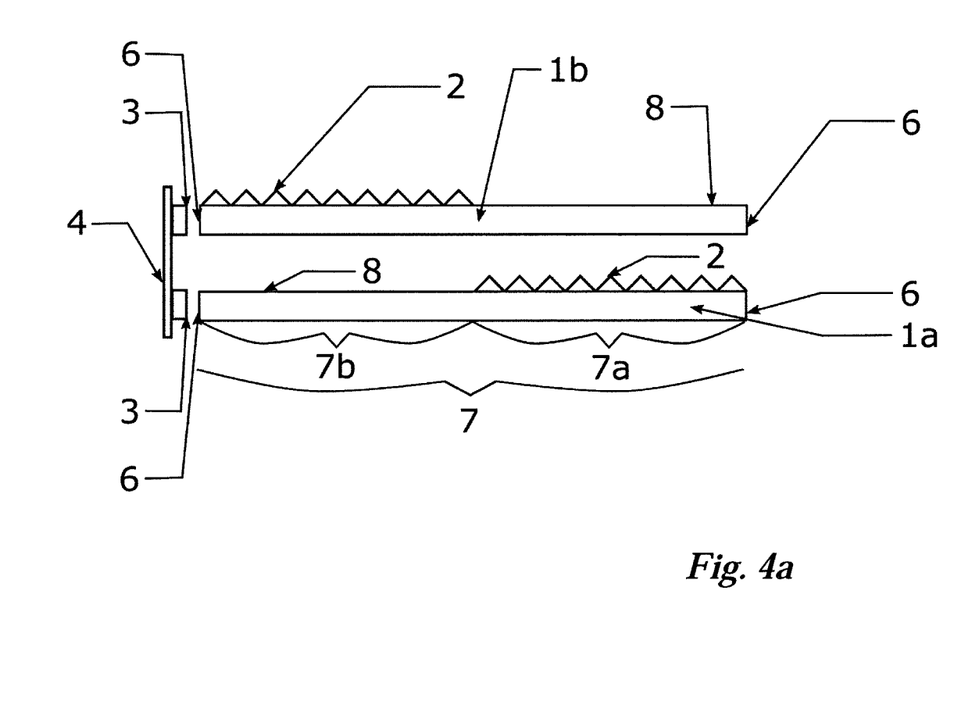
FIG. 4A shows a view in a longitudinal section of another embodiment example of an optical system according to the invention.

FIG. 4A shows another embodiment example of an optical system according to the invention. In this embodiment, the complete exit surface 7 of the front light guide 1a consists, in the direction from the end 6 facing the light sources 3, of the supplementary exit surface 7b for the exit of light produced by the rear light-guide 1b first, which is followed by the exit surface 7a for the exit of light produced by the light source 3 of the front light-guide 1a.

Figure 5:
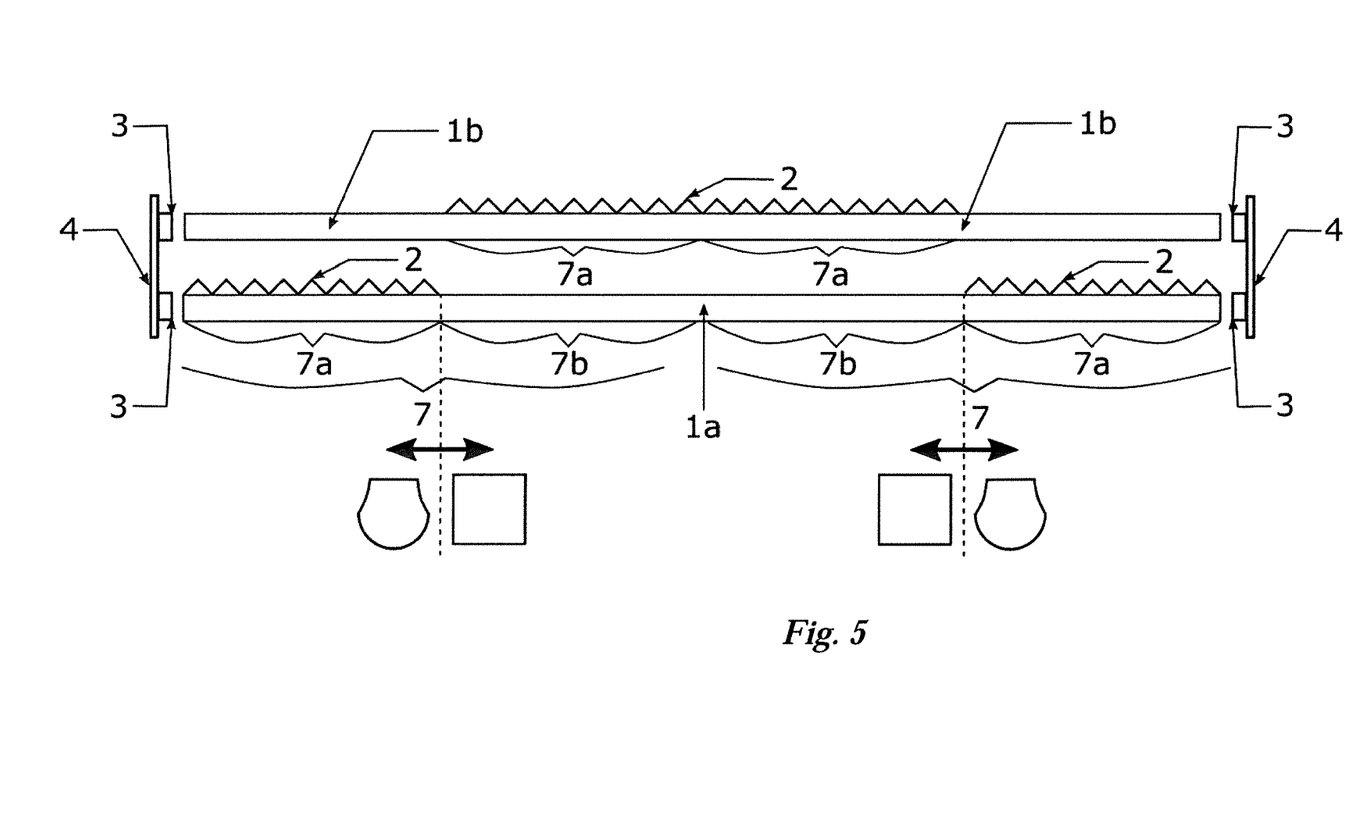
FIG. 5 shows a view in a longitudinal section of another embodiment example of an optical system according to the invention comprising a pair of light-guides and a pair of light sources situated at each side of the light-guides.

FIG. 5 shows another embodiment example of an optical system according to the invention. In this embodiment, the optical system according to the invention comprises a pair of adjacent light-guides 1a, 1b into which light is supplied that is emitted by two pairs of light sources 3 situated at both the ends of the light guides 1a, 1b. The front light-guide 1a is hypothetically divided lengthwise into two halves, each of them changing its profile in such a way that the profile gradually passes from a mushroom-like one to an oblong one in the direction from the ends 6 of the front light-guide 1a towards its center.

Figure 6:
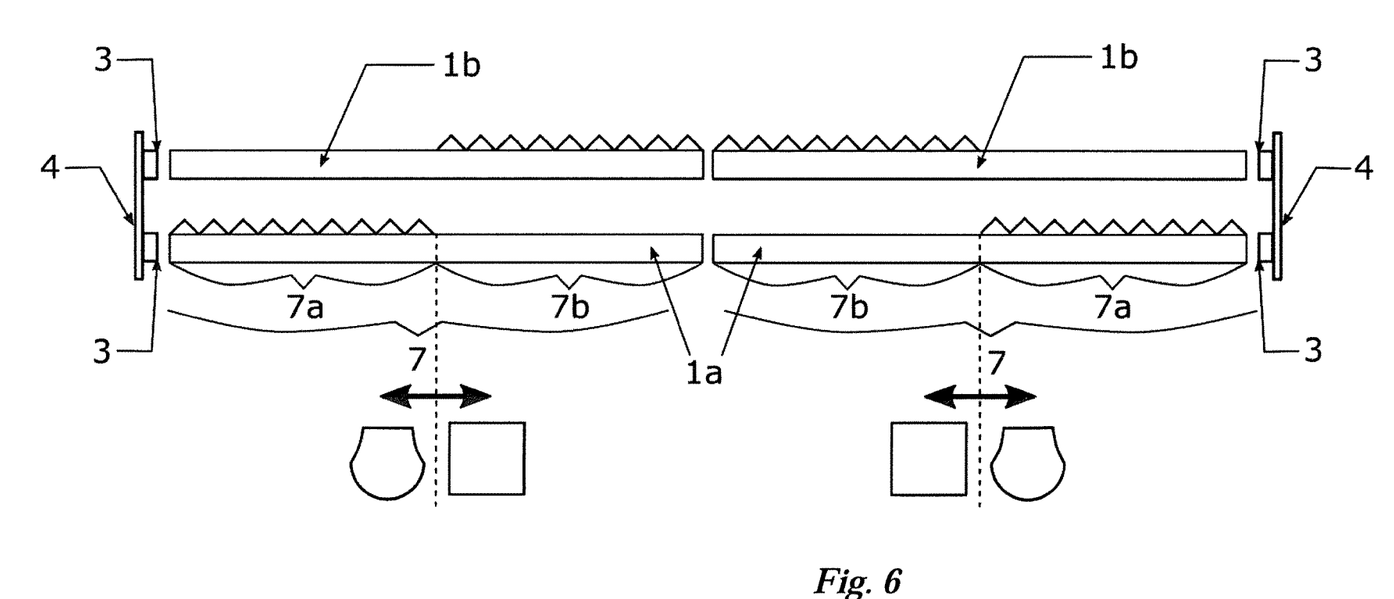
FIG. 6 shows a view in a longitudinal section of another embodiment example of an optical system according to the invention comprising two pairs of light-guides situated one in an extension of the other one wherein one pair of light sources is associated with each pair of light guides.

FIG. 6 shows another embodiment example of an optical system according to the invention. In this embodiment, the optical system according to the invention comprises two pairs of adjacent light-guides 1a, 1b wherein one pair is situated in an extension of the other one and each pair of light guides 1a, 1b is supplied by one pair of light sources 3. In each pair of light-guides 1a, 1b, the profile of the front light-guide 1a passes from a mushroom-like shape to an oblong profile, similarly to the embodiment of FIG. 4.

LIST OF REFERENCE MARKS

1a—front light-guide
1b—rear light-guide
2—optical element
3—light source
4—printed-circuit board
6—end
7—complete exit surface
7a—exit surface
7b—supplementary exit surface
8—shell
9—rear surface
10—light ray
11—front surface

The invention claimed is:
1. An optical system of a directional indicator for motor vehicles comprising:
(i) at least one pair of adjacent light-guides of a longitudinal shape,
wherein the pair of adjacent light-guides comprises a first light-guide and a second light-guide,
wherein a surface of the first light-guide comprises a first shell that connects a first proximal end and a first distal end of the first light-guide
wherein a surface of the second light-guide comprises a second shell that connects a second proximal end and a second distal end of the second light-guide,
wherein the first proximal end and the second proximal end are positioned in the same direction,
(ii) at least one pair of light sources comprising a first light source and a second light source associated with the first proximal end of the first light-guide and the second proximal end of the second light-guide,
wherein the pair of light sources emit light rays and ensure propagation of the light rays in the direction from the first proximal end of the first light-guide into the first light-guide and the second proximal end of the second light-guide into second light-guide,
wherein the first light-guide and/or the second light-guide are equipped with optical elements to reflect the light rays to a longitudinal exit surface located on the first shell and/or second shell for the light rays to exit from the first light-guide and/or the second light-guide,
wherein the first light-guide and the second light-guide are located with respect to each other in such a way that the first light-guide acts as a front guide and the second light-guide acts as a rear guide in an exit direction of the light rays from the longitudinal exit surface of the first light-guide,
wherein the light rays exiting the second light-guide enter the first light-guide through the first shell and exit the first light-guide via a longitudinal supplementary exit surface that creates a complete exit surface with the longitudinal exit surface of the first light-guide,
wherein the first light source and the second light source are time-controlled in such a way that a required dynamic light display is achieved on the complete exit surface.

2. The optical system according to claim 1, wherein the first light source and the second light source are time-controlled in such a way that a longitudinal part with the highest instantaneous intensity of light rays exiting the complete exit surface can gradually shift with time in a direction from one end of the first light-guide to another end of the first light-guide.

3. The optical system according to claim 1, wherein the supplementary exit surface of the first light-guide is a coherent continuation of the longitudinal exit surface.

4. The optical system according to claim 1, wherein the supplementary exit surface of the first light-guide partly lies on the longitudinal exit surface and a remaining part is a continuation of the longitudinal exit surface.

5. The optical system according to claim 1, wherein the supplementary exit surface of the first light-guide entirely lies on the longitudinal exit surface.

6. The optical system according to claim 1, wherein the first light source and the second light source are LED sources mounted on a common PCB.

7. The optical system according to claim 1, wherein the first light-guide comprises, in a longitudinal part where the light rays emitted by the second light-guide (1b) enter the first light-guide, the optical elements in a rear part.

8. The optical system according to claim 7, wherein the soptical elements are mounted on the surface of the first light-guide.

9. The optical system according to claim 1, wherein the first light-guide is, in a longitudinal part where the light rays from the second light-guide enter the first light-guide, without the optical elements.

10. The optical system according to claim 1, wherein the optical system comprises one pair of light sources to supply one pair of adjacent light-guides.

11. The optical system according to claim 1, wherein the first light-guide and the second light-guide have a mushroom-like shape in the cross-section comprising a convex front surface containing the longitudinal exit surface and a rear surface having a shape of a stripe, wherein the first light-guide has a bigger profile width relative to the second light-guide.

12. The optical system according to claim 1, wherein the second light-guide has a mushroom-like shape in the cross-section comprising a convex front surface containing the longitudinal exit surface and a rear surface having a shape of a stripe, wherein the first light-guide has a mushroom-like shape in the cross-section at one end, and an oblong shape at the other end that is adjacent to an area of the first shell through which the light rays emitted from the second light-guide enter the first light-guide, wherein the mushroom-like shape of the first light-guide gradually passes into the oblong shape.

13. The optical system according to claim 1, wherein the optical system comprises two pairs of light sources to supply one pair of adjacent light-guides, wherein the second light-guide has a mushroom-like shape in the cross-section comprising a convex front surface containing the longitudinal exit surface, and a rear surface having a shape of a stripe, wherein the first light-guide has a mushroom-like shape in the cross-section at one end and an oblong shape at the other end that is adjacent to an area of the first shell through which the light rays emitted from the second light-guide enter the first light-guide wherein the mushroom-like shape of the first light-guide gradually passes into the oblong shape of the first light-guide.

14. The optical system according to claim 1, wherein the optical system comprises two pairs of adjacent light-guides with one pair being positioned in an extension of the other pair.

* * * * *